United States Patent [19]

Thompson

[11] Patent Number: 5,664,871
[45] Date of Patent: Sep. 9, 1997

[54] VISOR WITH RECESSED MOUNTING CAPS ON TRAILING EDGE

[75] Inventor: Scott P. Thompson, Des Moines, Iowa

[73] Assignee: DFM Corporation, Indianola, Iowa

[21] Appl. No.: 739,792

[22] Filed: Oct. 30, 1996

[51] Int. Cl.⁶ .................................................. B60Q 1/26
[52] U.S. Cl. .......................... 362/80.1; 362/74; 362/83.3; 296/95.1
[58] Field of Search ........................... 296/97.5, 180.1, 296/95.1; 362/83.3, 80.1, 74

[56] References Cited

U.S. PATENT DOCUMENTS

| | | | |
|---|---|---|---|
| 5,108,142 | 4/1992 | Lund | 296/95.1 |
| 5,130,906 | 7/1992 | Lund | 362/80.1 |
| 5,452,933 | 9/1995 | Stanesic | 296/95.1 |
| 5,522,634 | 6/1996 | Stanesic | 296/95.1 |

*Primary Examiner*—Carroll B. Dority
*Attorney, Agent, or Firm*—Zarley, McKee, Thomte, Voorhees & Sease

[57] ABSTRACT

A windshield visor for mounting to the front portion of a vehicle cab, the visor having an integrally formed visor body with a plurality of recessed portions in its top surface. A plurality of caps are provided to substantially cover each of the recessed portions and form a cavity therebetween for housing a light fixture. The visor body attaches to the vehicle cab about the recessed portions, thereby allowing the caps to seal and protect both the mounting mechanism and optional light fixtures.

15 Claims, 3 Drawing Sheets

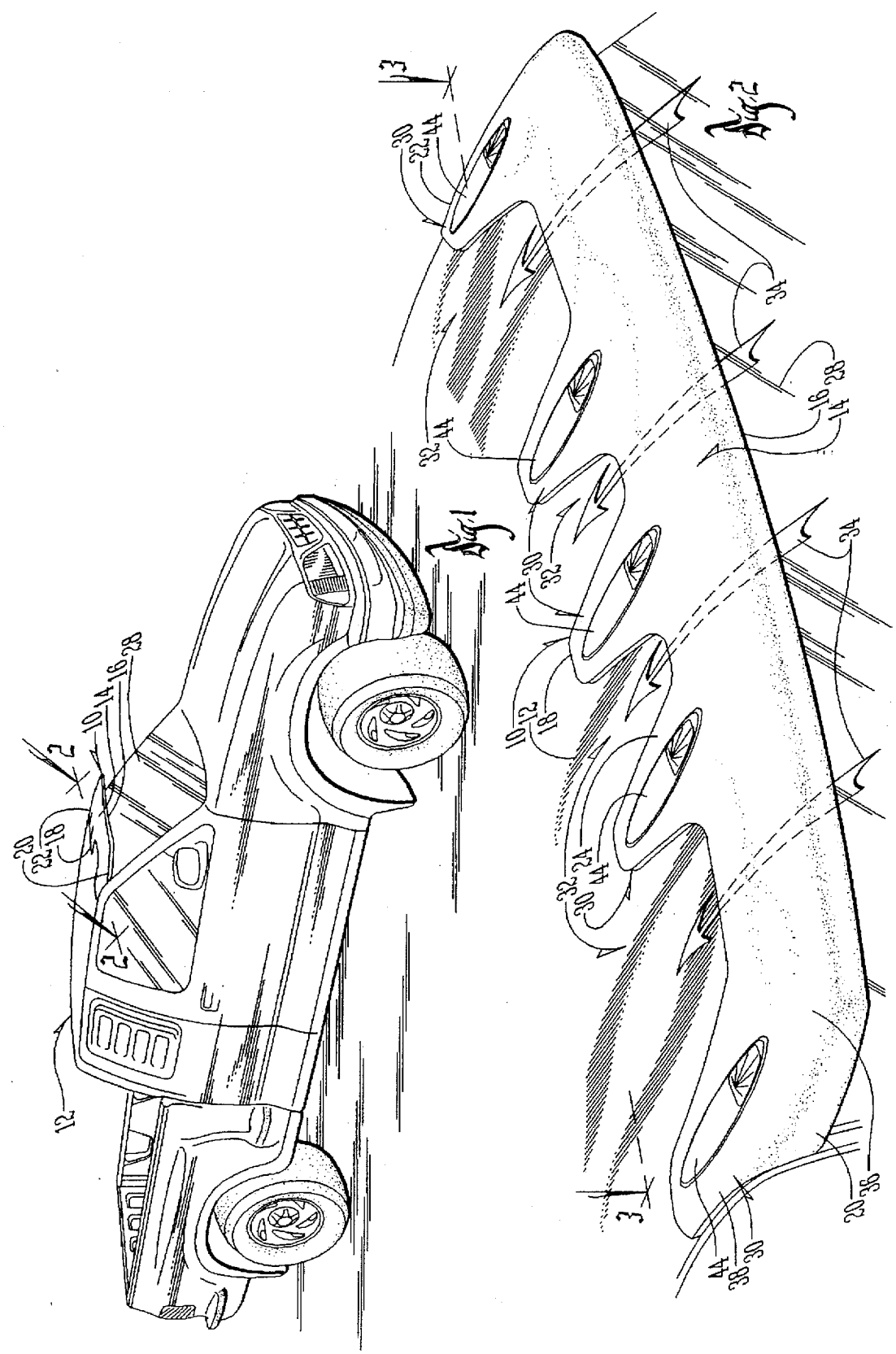

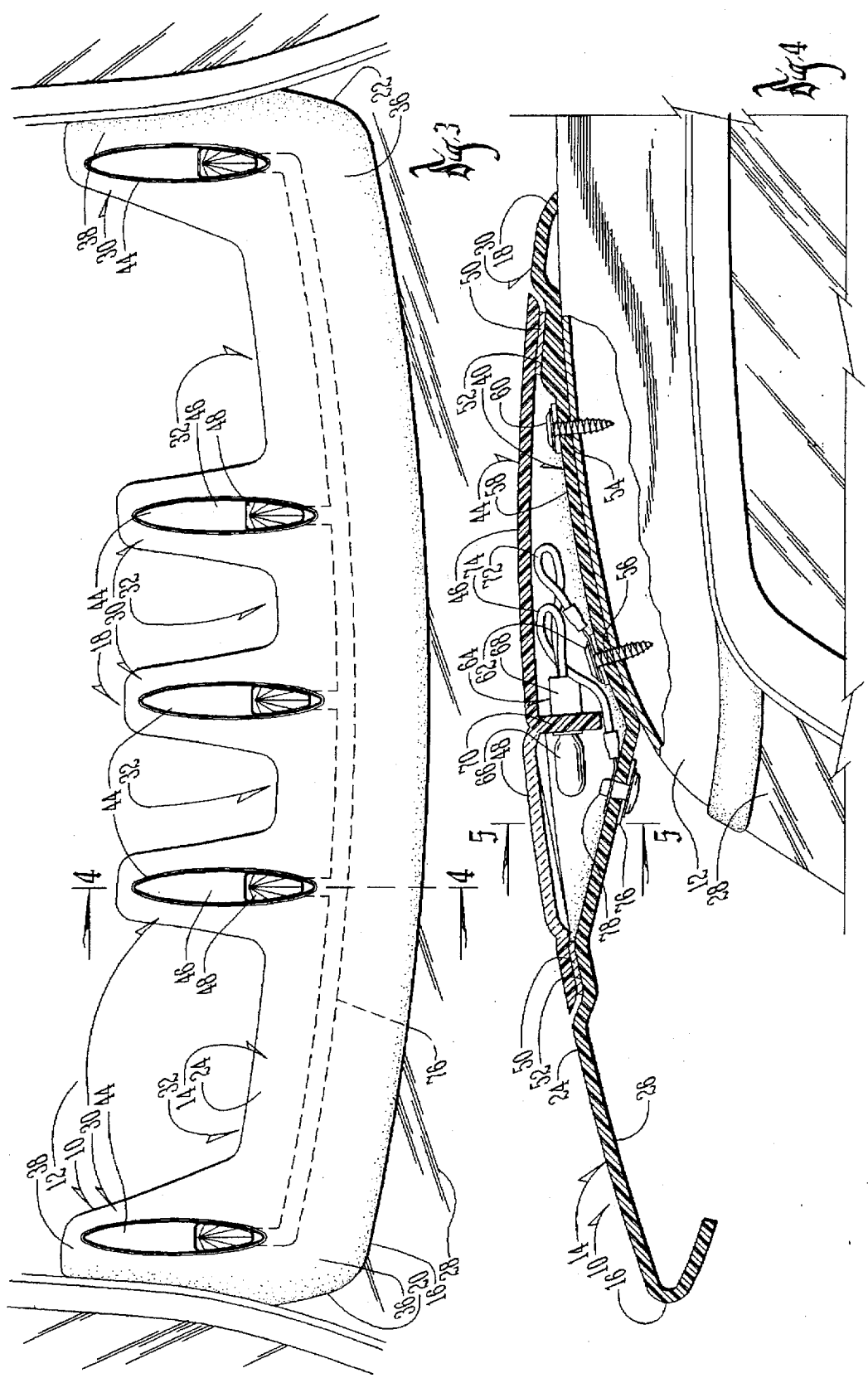

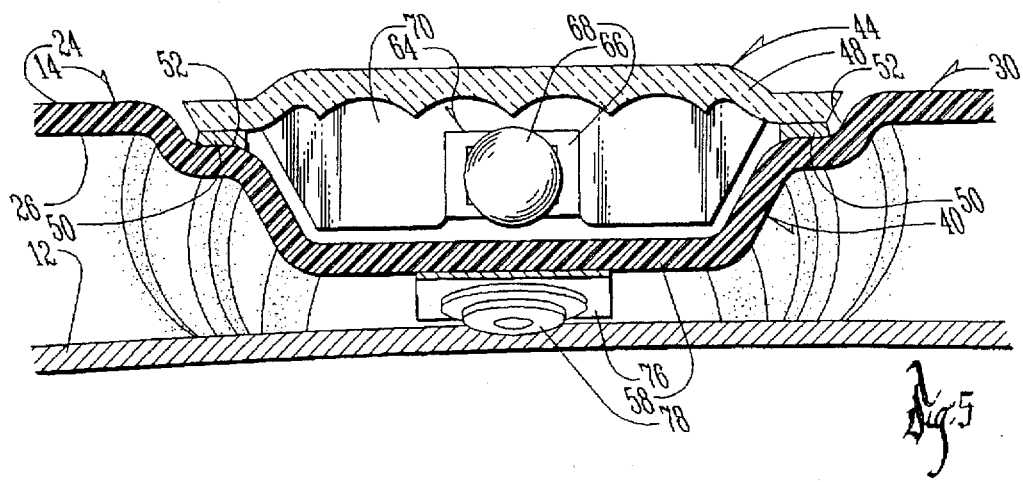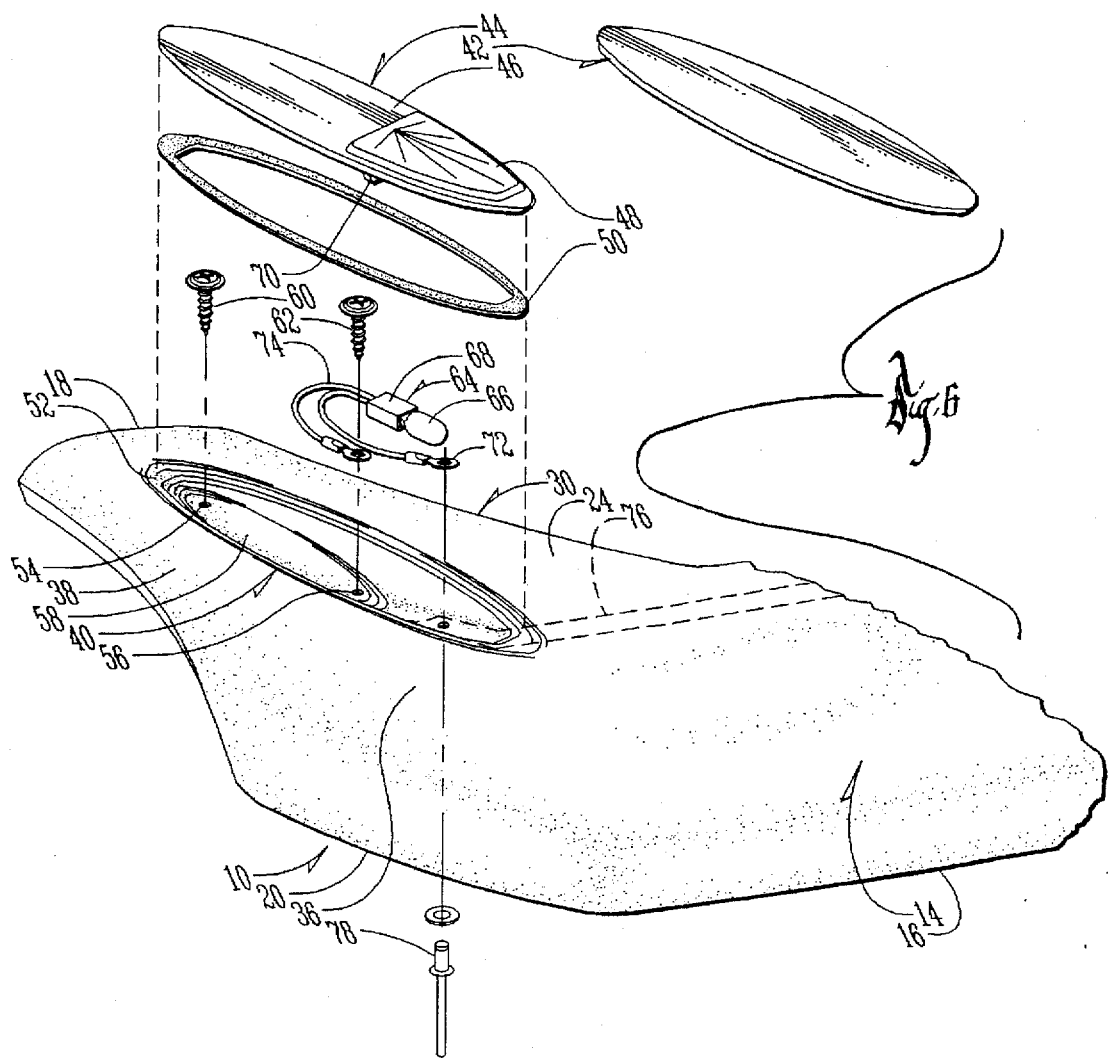

5,664,871

VISOR WITH RECESSED MOUNTING CAPS ON TRAILING EDGE

FIELD OF THE INVENTION

The present invention pertains to a windshield visor which is mountable to the front portion of a vehicle cab.

BACKGROUND OF THE INVENTION

The use of windshield visors for trucks and other motor vehicles is well known. Such visors are currently sold in the vehicle accessory market, often as plastic component kits attachable either by dealers or by the ultimate customers. These visors typically extend beyond the forward edge of the roof line of the vehicle cab, thereby extending above and beyond the plane of the windshield to shield the sun and rain and improve visibility. Some visors also provide a source of illumination to, among other things, enhance the aesthetic appeal of the visor.

Although these lightweight and attractive windshield visors have several desirable features, they also have some inherent problems. First, because the visor is located on the forward portion of the vehicle just above the windshield, it necessarily is subject to extreme wind forces. As a result, if the visor is improperly constructed or improperly mounted, extreme vibration will occur. This vibration is not only distracting and annoying to the driver, but also may cause damage to both the visor and the vehicle cab, especially at the point of attachment of the visor to the cab.

Prior art visors are also not easily adaptable for use with recessed light fixtures. That is, a separate visor design is required for customers who want the additional feature of lights recessed in the visor. A basic unitary design that can be used with or without lights would give the dealer and customer more flexibility, while at the same time reducing manufacturing costs and producing a more economical product.

Another problem with prior art windshield visors is that water and other debris tends to collect near the fastening mechanisms and light fixtures. As a result, the windshield visor begins to deteriorate more quickly, is less esthetically pleasing, and the light fixtures are more prone to failure.

Yet another problem with prior art visors is that the method of installing the recessed lights and the necessary wiring tends to be complex and time consuming. Much time and attention is required to install and connect the light fixtures. As such, there is a need in the art for a simple and efficient method of installing the visor lights and electrical wiring.

It can therefore be seen that there is a real and continuing need for the development of an improved, lightweight, economical, easy to install windshield visor.

The primary objective of the present invention is the provision of an improved windshield visor which is efficient in operation, economical to manufacture, and durable in use.

Another objective of the present invention is the provision of a windshield visor that reduces wind drag and turbulence to the visor.

Another objective of the present invention is the provision of a windshield visor which protects the fastening mechanisms and light fixtures from rain, debris, and other elements.

Still another objective of the present invention is the provision of a windshield visor for optional use with lights.

Another objective of the present invention is the provision of an improved method for providing a source of illumination for a windshield visor.

SUMMARY OF THE INVENTION

The foregoing objectives are achieved in a preferred embodiment of the invention by a windshield visor having an integrally formed visor body with a plurality of recessed portions in its top surface disposed generally toward the trailing edge of the visor. A plurality of caps are provided and attached to the visor body in such a way so as to substantially cover each of the recessed portions and form a cavity therebetween.

The invention can be used with or without recessed lights. If lighting is desired, a light fixture is disposed in the cavity formed between a recessed portion and a cap, the cap having a transparent lens to permit light to be emitted from the visor.

In its preferred form, the visor attaches to the vehicle cab about the recessed portions, thereby allowing the cap to seal and protect both the mounting mechanism and any light fixtures from rain, debris, and other elements.

BRIEF DESCRIPTION OF THE DRAWINGS

FIG. 1 is a perspective view of a vehicle with a windshield visor embodying the present invention attached.

FIG. 2 is an enlarged partial perspective of the vehicle and visor taken along line 2—2 of FIG. 1.

FIG. 3 is a top elevational view of the visor taken along line 3—3 of FIG. 2.

FIG. 4 is a sectional view taken along line 4—4 of FIG. 3.

FIG. 5 is a sectional view taken along line 5—5 of FIG. 4.

FIG. 6 is a partial exploded perspective of the visor showing a recessed portion with and without a light fixture.

DETAILED DESCRIPTION OF THE INVENTION

The present invention will be described as it applies to its preferred embodiment. It is not intended that the present invention be limited to the described embodiment. It is intended that the invention cover all alternatives, modifications, and equivalents which may be included within the spirit and scope of the invention.

With continuing reference to the drawings, the visor 10 may be mounted to a vehicle cab 12 as illustrated in FIG. 1. The visor 10 is comprised of a visor body 14 having a leading edge 16, a trailing edge 18, a first side 20, a second side 22, a top surface 24 and bottom surface 26. The leading edge 16 extends above and beyond the windshield 28. The trailing edge 18 is uneven and forms a plurality of rearward extensions 30. The gaps or floating points 32 formed by the trailing edge 18 between the rearward extensions 30 reduce the wind drag and resulting turbulence from the wind flow in the direction of the arrows 34. Both the first and second sides 20 and 22 of the visor body 14 have a first portion 36 extending above and beyond the windshield 28 and a second portion 38 contoured to fit the vehicle cab 12.

The visor body 14 is ideally formed of a thermoset plastic reinforced with woven fiberglass, with the thermoset plastic preferably being either polyester or polyurethane.

As shown more fully in FIGS. 4-6, a plurality of recessed portions 40 are provided in the top surface 24 of the visor body 14. Each recessed portion is positioned toward the trailing edge 18 in a rearward extension 30. These recessed portions 40 form a cavity for mounting light fixtures and also provide a surface to mount the visor 10 to the vehicle cab 12.

A plurality of caps 42, 44, each covering a recessed portion 40 are also provided. It should be appreciated that the visor 10 of the present invention is intended for use with or without light fixtures. If the visor is intended for use with light fixtures, then cap 44 is used, having an opaque portion 46 and a transparent lens 48 to permit light to be emitted from the visor. An amber or other colored lens may be used to add aesthetic appeal. Otherwise, an entirely opaque cap 42 is provided for visors without lights. Both caps 42 and 44 are shaped to conform flush with the top surface 24 of the visor body 14.

Regardless of the type of application, an adhesive flexible gasket 50 is inserted between the cap (42, 44) and the recessed mounting platform 52 of the recessed portion (see FIGS. 4–6). The cap (42, 44) and adhesive flexible gasket 50 effectively seal off the cavity formed between the cap and recessed portion 40, shielding any contents therein from water, debris, and other elements.

Apertures 54 and 56 are provided in the bottom wall 58 of each recessed portion 40. Fasteners 60 and 62 are inserted through apertures 54 and 56, respectively, and received in the vehicle cab 12 to mount the visor 10 to the front portion of the vehicle cab 12. Mounting the visor 10 about the recessed portions 40 not only shields and protects the fasteners (60, 62) from water and other debris, but also hides the fasteners to enhance the aesthetic appeal of the visor 10.

If lighting is desired, a plurality of light fixtures 64 are provided, each comprising a bulb 66 which resides in a socket 68 (see FIGS. 4–6). The socket is mounted in a downwardly extending wall 70 of the opaque portion 46 of cap 44. The socket 68 is held in place by the downwardly extending wall 70 by a frictional fit and/or adhesive material. A pair of wires 72 and 74 exit the rear of the socket 68. The ground wire 74 is secured to the forward fastener 62. This forward fastener 62 is made of a conductive material to both ground the light fixture 64 and secure the visor body 14 to the vehicle cab 12.

The power supply wire 72 is connected to a suitable source (not shown) of electrical power via a common power supply line 76 that interfaces with each of the recessed portions 40 along the width of the visor body 14 as shown in FIG. 4. It is preferred that a conductive paint strip 76 be positioned along the bottom surface of the visor body 14 and that a conductive pop rivet 78 be used to conductively attach each of the power supply wires 72 to the conductive strip 76. Other means and methods for wiring include a single conventional wire or an adhesive foil-type tape.

The method of installing the visor 10 of the present invention is simple and easy. If light fixtures 64 are desired, then the fixtures are mounted to caps 44 about the downwardly extending walls 70. The power supply wire 72 is secured to and placed in electrical contact with a pop rivet 78, which is disposed along the common power supply line 76. The ground wire 72 is secured to the forward conductive fastener 62. Next, the visor 10 is mounted to the front portion of the vehicle cab 12 by securing both the forward and rearward fasteners (72, 74) to the roof of the vehicle cab 12. Finally, the flexible adhesive gaskets 50 and caps (42, 44) are affixed to the recessed mounting platforms 52 of the recessed portions 40.

It can therefore be seen that the invention accomplishes at least all of its stated objectives.

What is claimed is:

1. A windshield visor for mounting to the front portion of a vehicle cab comprising:

an integrally formed visor body having a top surface, a bottom surface, a leading edge, a trailing edge, and a plurality of recessed portions including a source of illumination in said top surface disposed toward said trailing edge; and a plurality of caps, each of said caps being attached to said visor body so as to substantially cover one of said recessed portions.

2. The windshield visor of claim 1 wherein said cap having an upper surface substantially conforming to said top surface of said visor body.

3. The windshield visor of claim 1 further comprising:

securing means coupling each of said sources of illumination to said visor body.

4. The windshield visor of claim 3 wherein said caps being at least partially transparent to permit light to be emitted from said recessed portion and beyond said top surface of said visor body.

5. The windshield visor of claim 1 wherein said trailing edge of said visor body being uneven and forming a plurality of rearward extensions, said recess portions being disposed generally toward said rearward extensions.

6. The windshield visor of claim 1 further comprising an adhesive flexible gasket disposed between said cap and said visor body.

7. The windshield visor of claim 1 wherein said visor body being mounted to said vehicle cab proximate at least one of said recessed portions.

8. The windshield visor of claim 3 wherein said source of illumination includes a light fixture.

9. A windshield visor for mounting to the front portion of a vehicle cab comprising:

an integrally formed visor body having a top surface, a bottom surface, a leading edge, a trailing edge, and a plurality recessed portions in said top surface disposed toward said trailing edge;

a plurality of caps, each of said caps being attached to said visor body so as to substantially cover one of said recessed portions, said cap and said recessed portion forming a cavity there between;

at least one source of illumination, said source of illumination being disposed in one of said cavities; and securing means coupling each of said sources of illumination to said visor body.

10. The windshield visor of claim 9 wherein said source of illumination includes a light fixture having a ground terminal and said securing means includes a conductive fastener, said conductive fastener providing a ground connection to said ground terminal and securing said visor body to said vehicle cab.

11. The windshield visor of claim 8 wherein at least one of said recessed portions having an aperture for accepting a fastener to secure said visor body to said vehicle cab.

12. The windshield visor of claim 8 wherein each of said sources of illumination being powered via a conductive strip interfacing with said recessed portions.

13. The windshield visor of claim 12 wherein a conductive fastener connects an input terminal of each source of illumination with said conductive strip.

14. A method of providing a source of illumination for a windshield visor mounted to the front portion of a vehicle cab, comprising the steps of:

integrally forming at least one recessed portion in a top surface toward of trailing edge of said visor;

placing a source of illumination within said recessed portion such that light is emitted from said recessed portion; and affixing a substantially transparent lens to said visor body so as to substantially cover one of said recessed portions.

15. The method of claim 14 further comprising the step of detachably mounting said visor to said vehicle cab proximate at least one of said recessed portions.

* * * * *